United States Patent [19]
Gardner et al.

[11] Patent Number: 5,592,234
[45] Date of Patent: Jan. 7, 1997

[54] INTERFACE SYSTEM FOR A TELEVISION RECEIVER

[75] Inventors: Timothy J. Gardner; Spyros Bournias; Larry Johnson, all of Knoxville, Tenn.

[73] Assignee: U.S. Philips Corporation, New York, N.Y.

[21] Appl. No.: 362,037

[22] Filed: Dec. 22, 1994

[51] Int. Cl.$^6$ ................................................. H04N 5/44
[52] U.S. Cl. .......................... 348/553; 348/725; 348/571; 348/552
[58] Field of Search ..................................... 348/552, 553, 348/565, 571, 718, 719, 725, 836, 843, 554; 379/142; H04N 5/44

[56] References Cited

U.S. PATENT DOCUMENTS

| | | | |
|---|---|---|---|
| 4,337,480 | 6/1982 | Bourassin et al. | 348/552 |
| 4,649,428 | 3/1987 | Jones et al. | 358/188 |
| 4,789,860 | 12/1988 | Brennand et al. | 340/825.51 |
| 5,274,455 | 12/1993 | Nishide et al. | 348/552 |
| 5,359,367 | 10/1994 | Stockill | 348/552 |
| 5,404,393 | 4/1995 | Remillard | 348/552 |

FOREIGN PATENT DOCUMENTS

| | | |
|---|---|---|
| 60-052176 | 3/1985 | Japan . |
| 60-052177 | 3/1985 | Japan . |
| 60-052178 | 3/1985 | Japan . |
| 60-052179 | 3/1985 | Japan . |
| 60-052180 | 3/1985 | Japan . |
| 61-096886 | 5/1986 | Japan . |
| 61-112481 | 5/1986 | Japan . |
| 61-116476 | 6/1986 | Japan . |

*Primary Examiner*—Glenton B. Burgess
*Attorney, Agent, or Firm*—Edward W. Goodman

[57] ABSTRACT

An interface system for a television receiver includes an interface connector having a plurality contacts connected to various component circuits in the television receiver. In order to provide various functions for the television receiver, the interface system includes various circuit boards each having a plug connectable with the interface connector. The plug includes a number of contacts equal to or less than the plurality of contacts in the interface connector. Depending on the desired function, the circuit board further includes circuits for providing the function, these circuits being interconnected and connected to the appropriate contacts in the plug for connecting with the appropriate component circuits in the television receiver. The interface system allows the television receiver functions to be modified and/or updated without the need for opening the television and modifying the circuits and/or the wiring to the circuits.

6 Claims, 6 Drawing Sheets

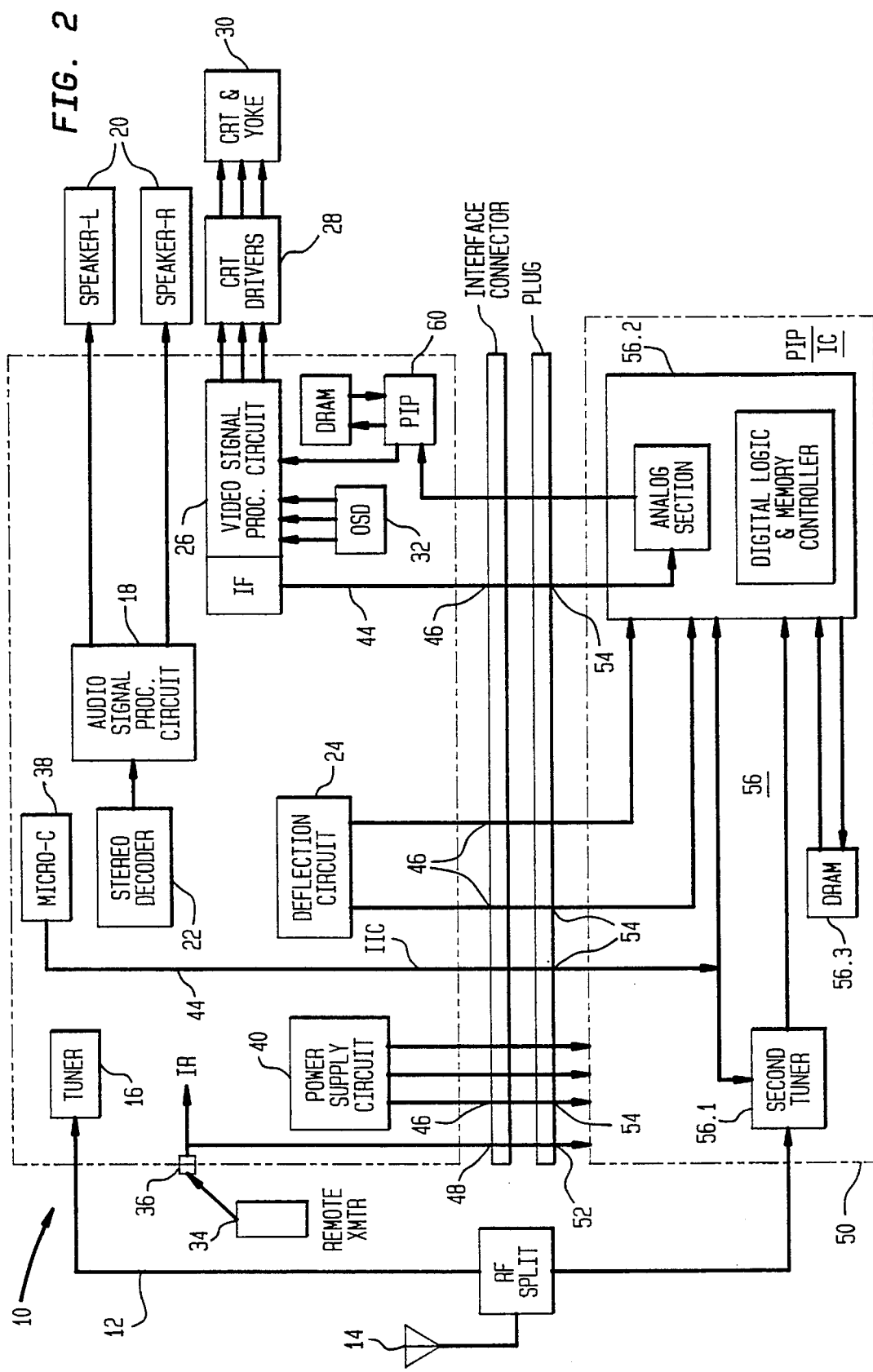

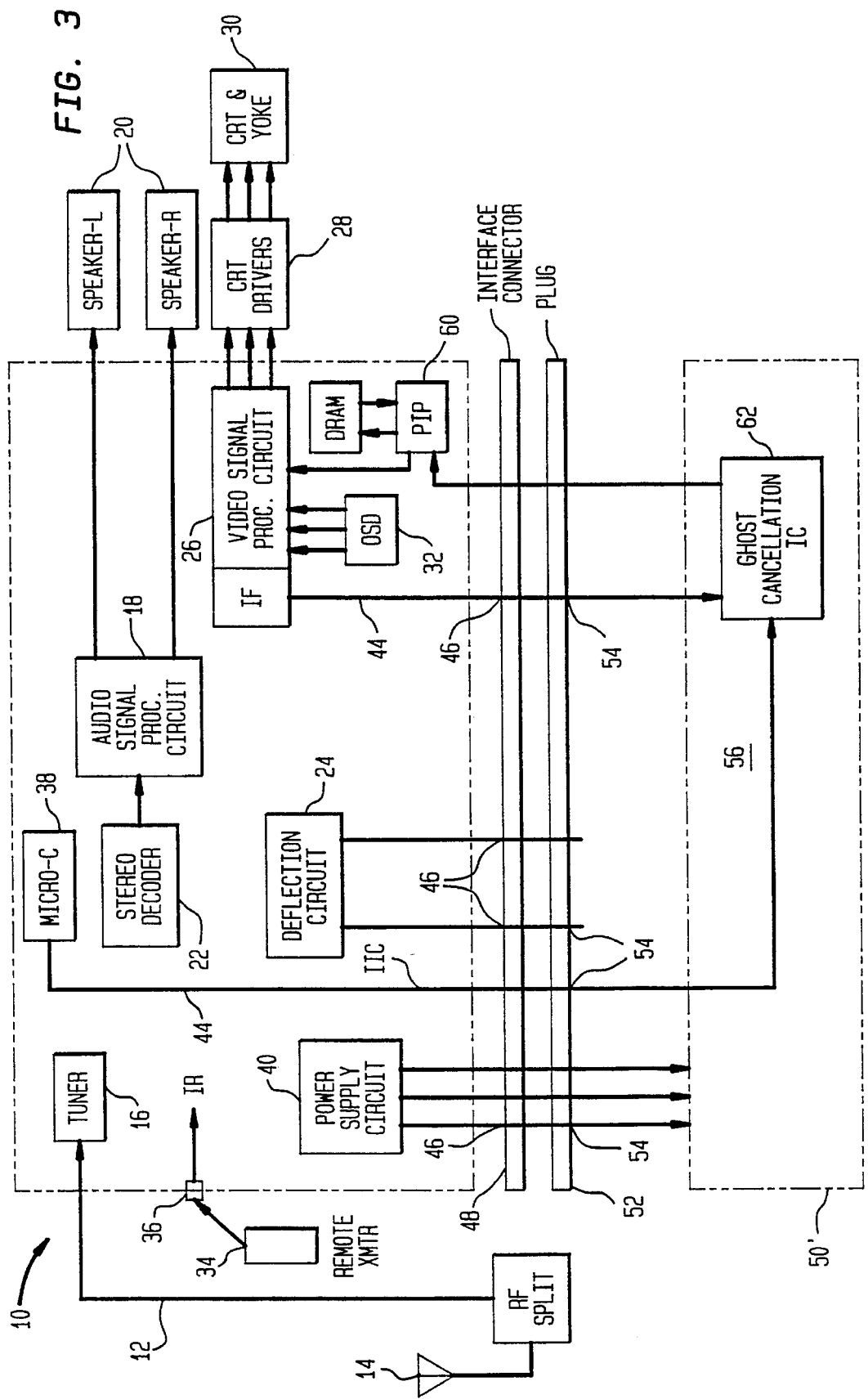

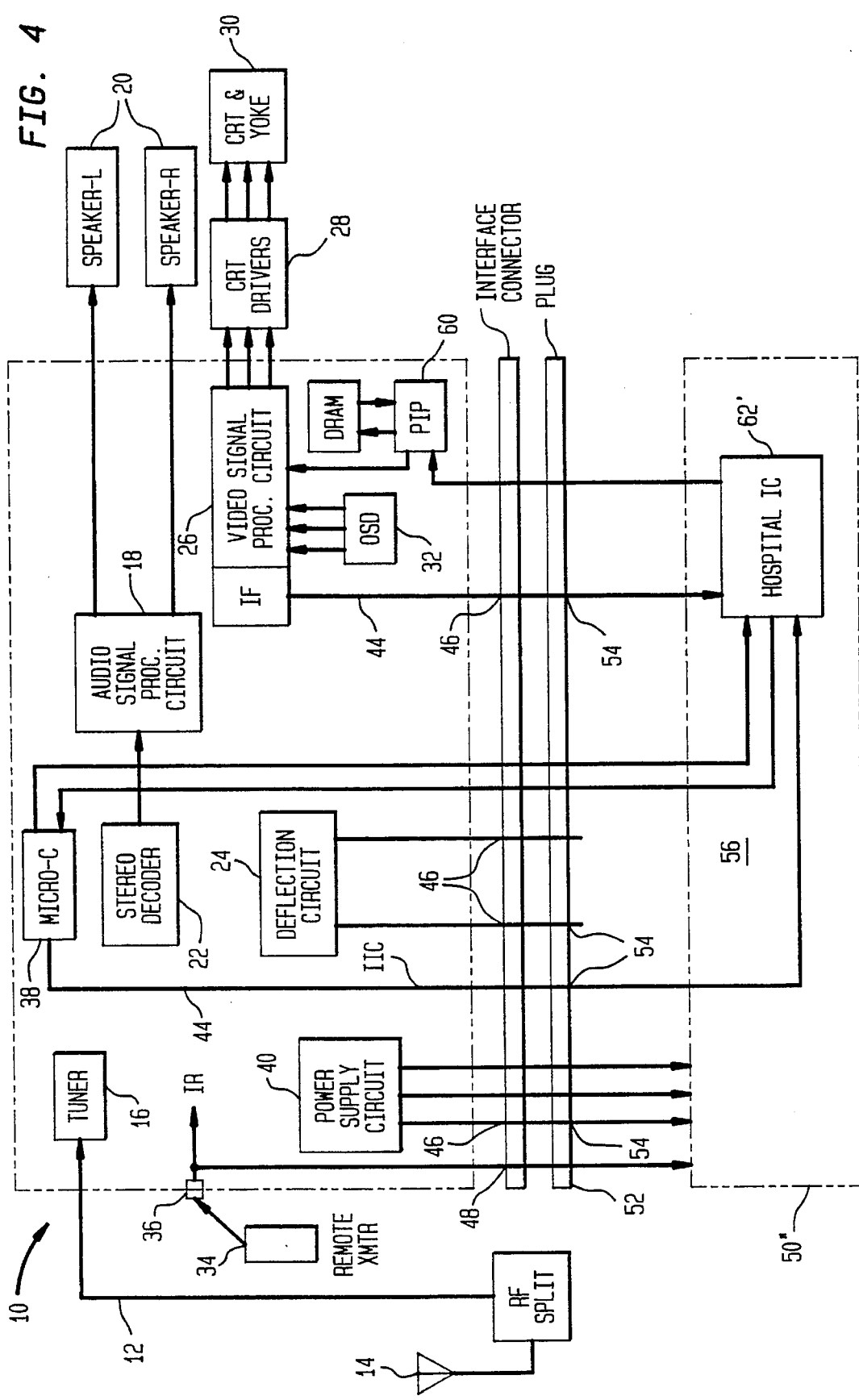

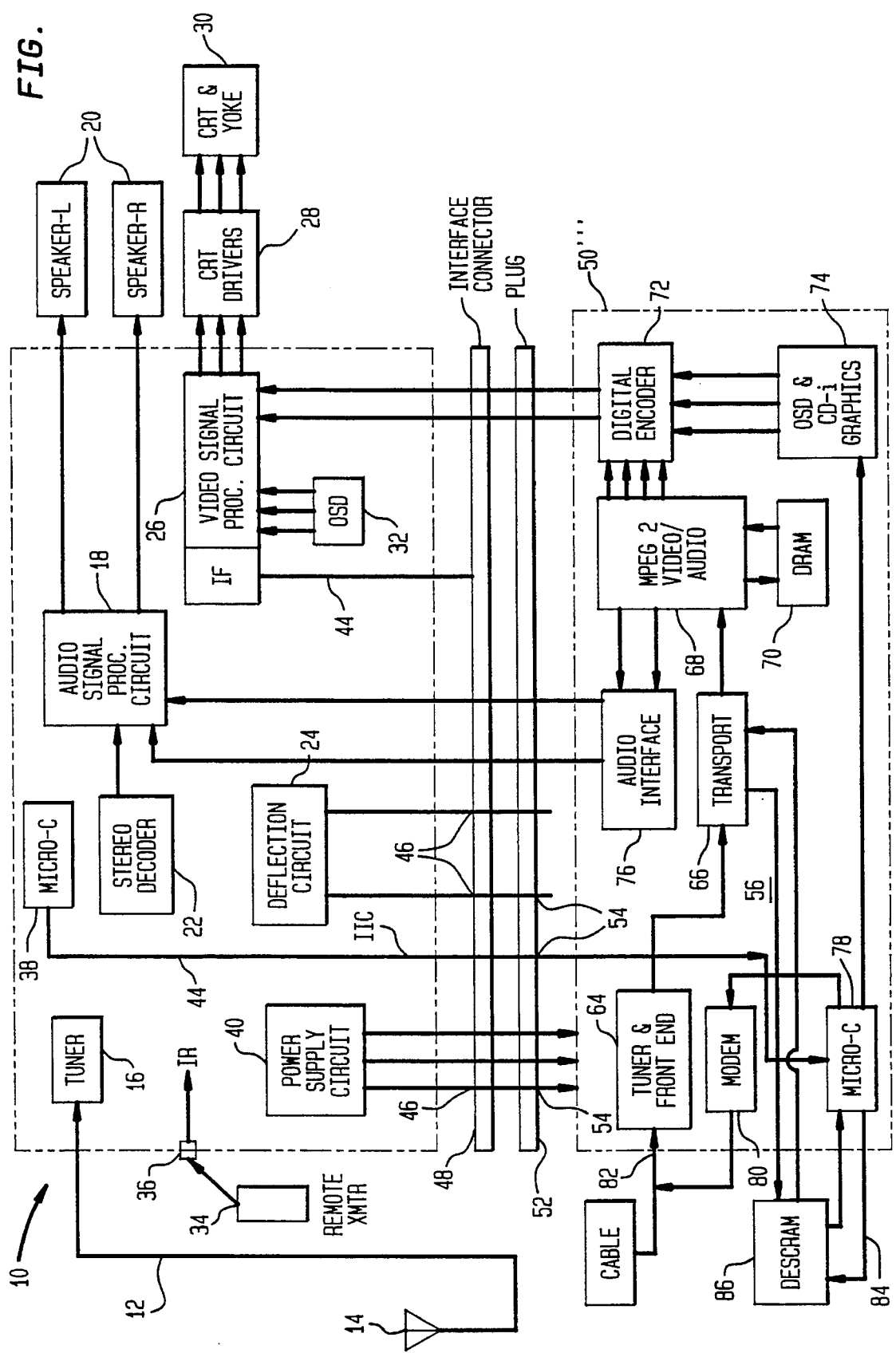

5,592,234

INTERFACE SYSTEM FOR A TELEVISION RECEIVER

BACKGROUND OF THE INVENTION

1. Field of The Invention

The subject invention relates to television receivers and the various functionality options now available to a user.

2. Description of The Related Art

Television receivers that are being marketed today have various optional functions which may be incorporated therein. For example, the television receiver may include Picture-in-Picture (PIP) in which the video signal for PIP is provided by a second signal source (a VCR) connected to a second video input of the television receiver, or a second tuner so that the television receiver may by itself provide PIP. These and other optional features are provided by modifying the circuitry inside the television receiver. Quite naturally, these changes must be implemented in the production line resulting in a plurality of different models of the television receiver being fabricated. It should be apparent that this results in relatively high production costs. In marketing these separate models of television receivers, a dealer must then anticipate what features his/her customers would desire, and order sufficient quantities of the specific models. Any others must be ordered specifically for that consumer which may result in a lost sale.

In another situation, unless the particular model of television receiver in the user's possession has the appropriate features, the user must open up the television receiver, and cut into existing wiring so that the user may be able to adapt the television receiver for use with, for example, a computer.

SUMMARY OF THE INVENTION

It is an object of the present invention to devise a standard television receiver which is easily adaptable for different functionalities.

It is a further object of the present invention to provide a standard television receiver in which the different functionalities may be adapted without opening the television receiver and physically modifying the circuitry therein.

The above objects are achieved in an interface system for a television receiver, said television receiver comprising a tuner for receiving and selectively tuning to a television signal, a deflection circuit coupled to said tuner for generating deflection signals from synchronization signals contained in said television signal, an audio signal processing circuit coupled to said tuner for processing an audio signal contained in said television signal, a video signal processing circuit coupled to said tuner for processing a video signal contained in said television signal, and a display coupled to said deflection circuit and said video signal processing circuit for displaying said video signal in dependence on said deflection signals, characterized in that said interface system comprises:

standard bus means having M leads separately connected to said audio signal processing circuit, said deflection circuit and said video signal processing circuit, where M is an integer greater than one;

connector means having M contacts connected, respectively, to said M leads in said standard bus means; and circuit board means accessible by a user of said television receiver, said circuit board means having plug means connectable to said connector means, said plug means having N contacts corresponding, respectively, to at least some of the M contacts in said connector means, where N is an integer less than or equal to M, and circuit means connected to said N contacts in said plug means, said circuit means, when connected through said plug means, said connector means and said standard bus means to at least one of the audio signal processing circuit, the video signal processing circuit and the deflection circuit in the television receiver, modifies the operation of said television receiver thereby providing additional features for the user.

As shown in FIG. 1, the interface system of the subject invention allows a television receiver to be modified and/or upgraded to various different functionalities including: CD-Video, CD-i, television/computer interface, ghost cancellation, dual tuner PIP, digital compressed video cable interface, hotel/motel/hospital pay-per-view system, etc., just by plugging the appropriate circuit board into the interface connector.

BRIEF DESCRIPTION OF THE DRAWINGS

With the above and additional objects and advantages in mind as will hereinafter appear, the invention will be described with reference to the accompanying drawings, in which:

FIG. 2 shows, in block diagram form, a standard television receiver, in which the interface system is used to provide a second video source and a second PIP;

FIG. 3 shows, in block diagram form, the standard television receiver, in which the interface system is used to provide ghost cancellation;

FIG. 4 shows, in block diagram form, the standard television receiver, in which the interface system is used to provide a hospitality product;

FIG. 5 shows, in block diagram form, the standard television receiver, in which the interface system is used to interface the television receiver with a digital compressed video cable system;

DESCRIPTION OF THE PREFERRED EMBODIMENTS

Figure 1:
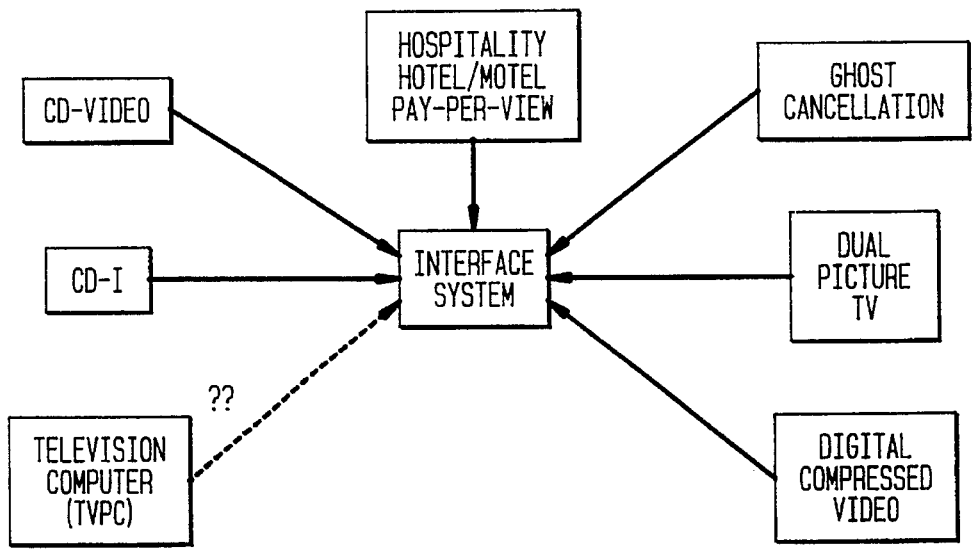
FIG. 1 shows the various different applications for the interface system of the subject invention.

FIG. 2 shows a standard television receiver 10 having an input 12 for receiving television signals from, for example, an antenna 14. The input 12 is connected to a tuner 16 for tuning the television to a particular television signal. The output from the tuner 16 is connected, on the one hand, to an audio signal processing circuit 18 which separates an audio signal from the received television signal and generates signals for application to speakers 20. The audio signal processing circuit 18 includes a stereo decoder 22 which decodes the audio signal in the television signal from the tuner 16 into separate left and right audio signals, in which case the speakers include a left and a right speaker for receiving the amplified left and right audio signals. The output from the tuner 16 is also applied to a deflection circuit 24 for generating deflection signals from the synchronization signals contained in the television signal, and to a video signal processing circuit 26 for processing the video signal contained in the television signal into component signals for application to CRT driver circuits 28 for driving a cathode ray tube (crt) 30, which receives the deflection signals from the deflection circuit 24. The video signal processing circuit 26 also includes an on-screen display circuit 32 for providing video signals indicating messages for display of the crt 30. As noted in FIG. 2, an infrared remote control transmitter 34 is shown for interaction with a remote control receiver 36 in the television receiver 10. A microcomputer 38 is also shown which controls the operation of the other elements in the television receiver 10. Finally, a power supply circuit 40 is shown which provides operating power to each of the above circuits. It should be noted that the connecting lines between these components have been omitted for clarity, any one skilled in the art would know how each of these circuits would be interconnected.

The subject invention includes the provision of a standard bus having lines 44 connected to each of the above-noted components. These lines 44 are then connected to contacts 46 in an interface connector 48. A circuit board 50 is then provided with a plug 52 having contacts 54 for engaging with the contacts 46 in the interface connector 48. In particular, depending on the functionalities to be offered by the particular circuit board 50, various of the contacts 54 in the plug 52 are connected to circuits 56 mounted on the circuit board 50. In particular, as shown in FIG. 2, these circuits 56 include a second tuner 56.1, a PIP IC 56.2, and a DRAM 56.3. The contacts 54 being used in the plug 52 connect with the contacts 46 in the interface connector 48 connected to the power supply circuit 40, the deflection circuit 24, the video signal processing circuit 26, and the microcomputer 38. The power supply circuit 40 supplies power to the second tuner 56.1, the PIP IC 56.2 and the DRAM 56.3. Then, under control of the microcomputer 38, the video signal processing circuit 26 provides the main video signal to the PIP IC 56.2 on the circuit board 50. Based on the television signal being tuned with the second tuner 56.1 which, for this purpose, is connected to an RF input 58 mounted on the circuit board 50, this signal is inserted into the main video signal as a PIP signal and the combined video signal is sent to a PIP circuit 60 in the video signal processing circuit 26 for presenting the main video signal and the PIP video signal as, for example, two side-by-side PIP images. FIG. 2 further shows the remote control receiver 36 also being connected to a contact 48 on the interface connector 48 for connecting with a contact 54 in the plug 52 which, in turn, is connected to the circuit board 50. This enables remote control signals to be processed both by a remote control circuit (not shown) on the circuit board 50 as well as by the microcomputer 38, depending upon the nature of the remote control signal being received.

FIG. 3 shows an embodiment in which the interface system provides ghost cancellation. In particular, the circuit board 50' includes a ghost cancellation IC 62 which receives power from the power supply circuit 40. Under control of a signal from the microcomputer 38, the video signal processing circuit 26 provides the video signal to the ghost cancellation IC 62 which then applies a ghost-free video signal back to the video signal processing circuit 26

FIG. 4 shows an embodiment in which the interface system provides a hospitality product. In particular, hospitals, hotels, motels, etc. may want the feature of being able to provide pay-per-view service. This hospitality functionality is provided by a circuit board 50" which is substantially similar to circuit board 50' with the exception that the ghost cancellation IC 62 is replaced by a hospital IC 62' which receives further control signals from the microcomputer 38.

In FIG. 5, an embodiment is shown in which the interface system provides the capability of receiving and processing compressed digital video signals from, for example, a cable system which includes means for decryption of "premium" scrambled signals provided by the cable supplier. In particular, the circuits 56 on the circuit board 50''' include a tuner/QAM/VSB front end 64, a transport 66, a digital video/audio decoder (e.g., MPEG 2) 68 with an associated DRAM 70, a digital NTSC encoder 72, an on-screen display and/or CD-i graphics and DRAM 74, an audio interface circuit 76, a microcomputer 78 including an FSK modem 80, an input/output port 82 for the cable, and a port 84 for receiving a decryption card 86. These separate circuits are interconnected as shown in FIG. 5 and are connected through contacts 54 on the plug 52 and contacts 46 in the interface connector 48 to the power supply circuit 40, the microcomputer 38, the audio signal processing circuit 18, and the video signal processing circuit 26. It should be noted that the contacts 46 on the interface connector 48 for the power supply circuit 40 and the microcomputer 38 are the same for all the embodiments of FIGS. 2–4. However, while the embodiments of FIGS. 2 and 3 provide a CBVS (composite) video signal for the video signal processing circuit 26, the embodiment of FIG. 5 provides separate luminance and chrominance component signals for improved picture performance. Hence, these signals are provided on contacts 46/54 separate from those that carry the composite video signal of FIGS. 2 and 3. Additionally, the embodiments of FIGS. 2 and 3 did not concern audio. Hence, while the audio signal processing circuit 18 is connected to the interface connector 48 in all cases, only here in FIG. 4 is there a connection from the audio interface circuit 76 to the respective contacts 54 on the plug 52 on the circuit board 50'''.

Figure 6:
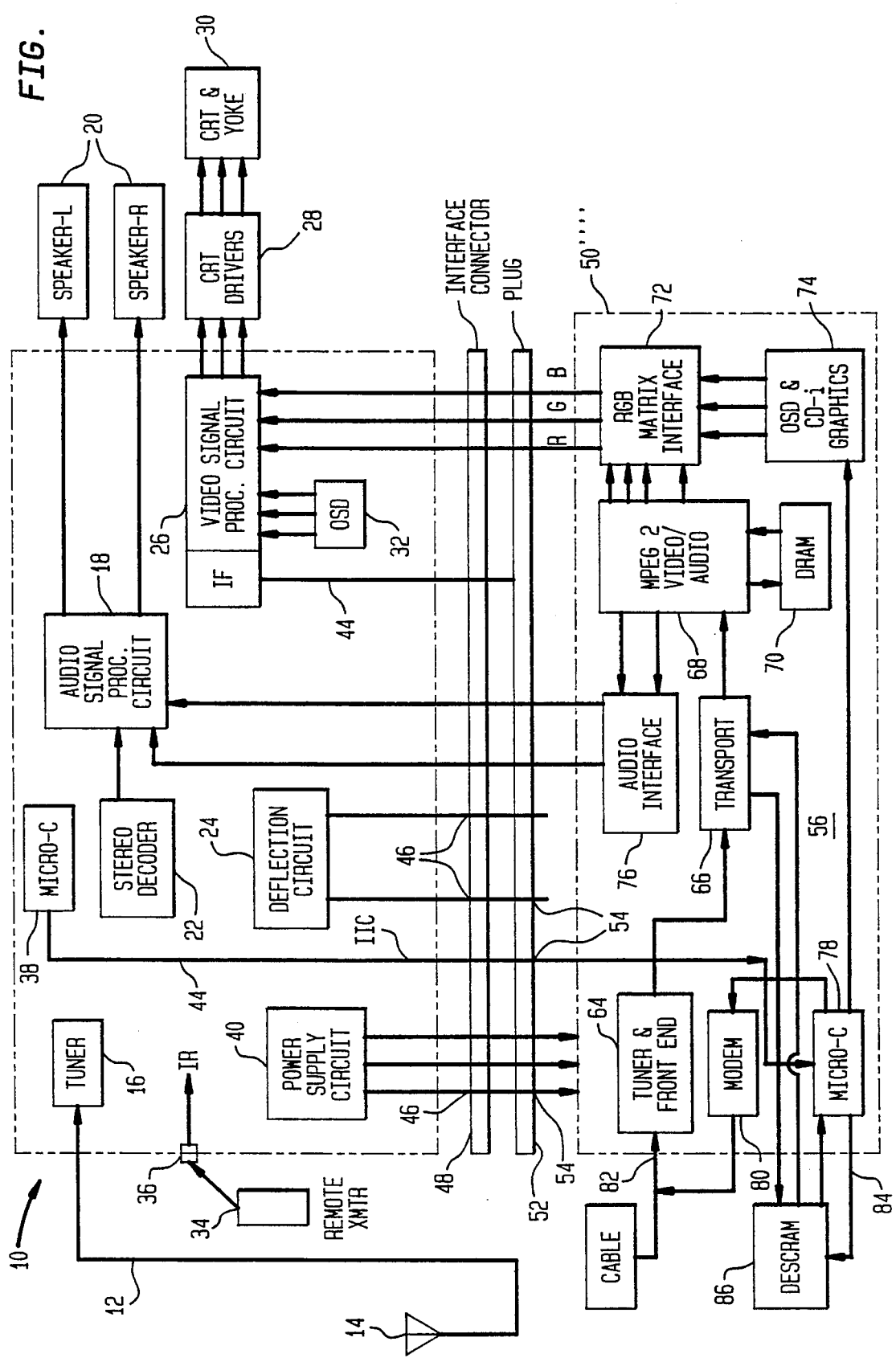
FIG. 6 shows the system of FIG. 5, with the exception that analog RGB signals are being provided.

The embodiment of FIG. 6 is substantially similar to that of FIG. 5 with the exception that instead of the digital NTSC encoder 72, this embodiment includes an RGB matrix interface 88 which provide analog RGB signals. Again, separate contacts 54 are used on the plug 52 which connect with respective contacts 46 on the interface connector 48 connected to respective inputs of the video signal processing circuit 26.

Figure 7:
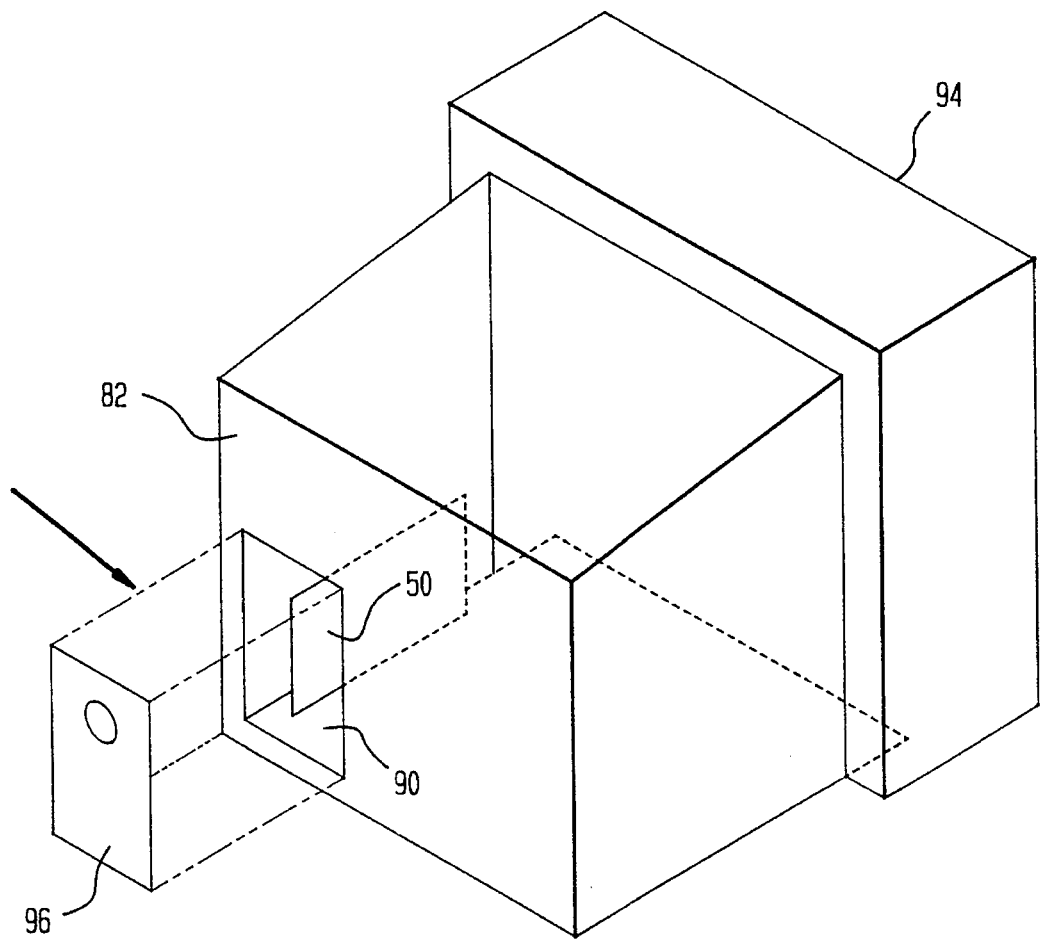
FIG. 7 shows how the interface system is mounted in the housing of a television receiver.

As shown in FIG. 7, the interface connector 48 may mounted in a recessed area 90 in the back panel 92 of the housing 94 of the television receiver. A separate cover 96 attached to the appropriate circuit board 50 containing the circuits 56 and the plug 52 engages with the back panel 92 of the housing 94 as the plug 52 engages with the interface connector 48 thereby closing the recessed area 90. Alternatively, the circuit board 50 is inserted into the recessed area 90 separate from the cover 96 until the plug 52 engages the interface connector 48. The cover 96 is then positioned over the recessed area 90.

Numerous alterations and modifications of the structure herein disclosed will present themselves to those skilled in the art. However, it is to be understood that the above described embodiment is for purposes of illustration only and not to be construed as a limitation of the invention. All such modifications which do not depart from the spirit of the invention are intended to be included within the scope of the appended claims.

What is claimed is:

1. An interface system for a television receiver, said television receiver comprising a tuner for receiving and selectively tuning to a television signal, a deflection circuit coupled to said tuner for generating deflection signals from synchronization signals contained in said television signal, an audio signal processing circuit coupled to said tuner for processing an audio signal contained in said television signal, a video signal processing circuit coupled to said tuner for processing a video signal contained in said television signal, a display coupled to said deflection circuit and said video signal processing circuit for displaying said video signal in dependence on said deflection signals, and a power supply circuit for supplying operating power to each of the above components, characterized in that said interface system comprises:

standard bus means having M leads separately connected to said audio signal processing circuit, said deflection circuit, said video signal processing circuit and said power supply circuit, where M is an integer greater than one;

connector means having M contacts connected, respectively, to said M leads in said standard bus means; and circuit board means accessible by a user of said television receiver, said circuit board means having plug means connectable to said connector means, said plug means having N contacts corresponding, respectively, to at least some of the M contacts in said connector means, where N is an integer less than or equal to M, and circuit means connected to said N contacts in said plug means, said circuit means, when connected through said plug means, said connector means and said standard bus means to at least one of the audio signal processing circuit, the video signal processing circuit, the deflection circuit and the power supply circuit in the television receiver, modifies the operation of said at least one of the audio signal processing circuit, the video signal processing circuit, the deflection circuit and the power supply circuit in the television receiver, whereby additional features are provided for the user.

2. An interface system as claimed in claim 1, wherein said television receiver further comprises a remote control receiver for receiving remote control signals from a remote control transmitter, and a microcomputer for controlling said television receiver at least partly in response to signals from said remote control receiver, characterized in that said standard bus means includes leads separately connected to said remote control receiver and said microcomputer, said remote control receiver and said microcomputer being connected to said circuit board means by said connector means and said plug means so that said remote control signals may be processed by said circuit means on said circuit board means, and said circuit means on said circuit board means being controlled by said microcomputer.

3. An interface system as claimed in claim 1, wherein said interface system provides a source for a further television signal, and wherein said video signal processing circuit includes a picture in picture (PIP) circuit for processing said further television signal as a PIP signal, characterized in that the circuit means on said circuit board means includes a further tuner connected to an RF input on said circuit board means for tuning to said further television signal, a PIP IC coupled to an output of said further tuner, and a DRAM connected to said PIP IC, said further tuner and said PIP IC having power and control inputs connected to contacts in said plug means which in turn connect with contacts in said interface connector means connected to said power supply circuit and a microcomputer in said television receiver, and said PIP IC having signal inputs and outputs connected to contacts in said plug means which, in turn, connect with contacts in said interface connector means connected to signal outputs of said video signal processing circuit and signal inputs of said PIP circuit, whereby, under control of said microcomputer, said further television signal being tuned by said further tuner is inserted into a main video signal, tuned by said tuner in said television receiver and supplied by said video signal processing circuit, as a PIP signal, and the combined video signal is sent to the PIP circuit in the video signal processing circuit such that the video signal tuned by said tuner and the further television signal tuned by said further tuner appear in a same picture frame.

4. An interface system as claimed in claim 1, wherein said interface system provide ghost cancellation for said television receiver, and said television receiver further includes a microcomputer for controlling functions of the television receiver, characterized in that said circuit means on said circuit board means include a ghost cancellation IC having power and control inputs connected to contacts in said plug means for connecting with contacts in said interface connector means connected to said power supply circuit and said microcomputer in said television receiver, said ghost cancellation IC further having signal inputs and outputs connected to contacts in said plug means for connecting with contacts in said interface connector means connected to outputs and inputs, respectively, in said video signal processing circuit, whereby under control of said microcomputer, said video signal processing circuit provides a video signal to said ghost cancellation IC and said ghost cancellation IC provides a ghost-free version of said video signal back to said video signal processing circuit.

5. An interface system as claimed in claim 1, wherein said interface system enables said television receiver to receive and process compressed digital video signals, and said television receiver further includes a microcomputer for controlling functions of said television receiver, characterized in that the circuit board means includes an RF input for receiving said compressed digital video signals modulated on RF carriers, a further tuner coupled to said RF for tuning in one of said RF carriers, a front end coupled to an output of said further tuner for processing said RF carrier and for providing said compressed digital video signals, a transport coupled to an output of said front end for selectively unscrambling said compressed digital video signals, a decompression circuit coupled to an output of said transport for decompressing said compressed digital video signals, and an encoder coupled to an output of said decompression circuit for providing separated luminance and chrominance component signals, said circuit board means further including an audio interface coupled to outputs of said decompression circuit for providing digital audio signals, a descrambling circuit coupled to inputs and outputs of said transport circuit for descrambling the compressed digital video signals, and a further microcomputer coupled to said descrambling circuit for controlling the descrambling circuit, and coupled to a graphics control circuit for generating graphics for display, said graphics control circuit being connected to an input of said encoder, said circuit board means further including a modem coupled to said RF input for transmitting signal from said further microcomputer, each of said elements having power and control inputs connected to contacts of said plug means for connecting with contacts in said interface connector means connected to said power supply circuit and said microcomputer, and said audio interface and said encoder include signal outputs connected to contacts in said plug means for connecting with contacts in said interface connector means connected with inputs in said audio signal processing circuit and said video signal processing circuit.

6. An interface system as claimed in claim 5, characterized in that said encoder alternatively provides analog RGB signals which are applied to separate contacts in said plug means for connecting with contacts in said interface connector means connected with analog RGB inputs in said video signal processing circuit.

\* \* \* \* \*